United States Patent [19]

Saferstein et al.

[11] 4,057,532

[45] Nov. 8, 1977

[54] SELF-EXTINGUISHING, NON-DRIPPING, PHENOLPHTHALEIN POLYESTER MOLDING COMPOSITIONS

[75] Inventors: Lowell Saferstein, Piscataway; Robert W. Stackman, Morristown, both of N.J.

[73] Assignee: Celanese Corporation, New York, N.Y.

[21] Appl. No.: 662,055

[22] Filed: Feb. 27, 1976

[51] Int. Cl.² ............................................. C08G 63/12
[52] U.S. Cl. ................................. 260/47 C; 260/75 R
[58] Field of Search ..................................... 260/47 C

[56] References Cited

U.S. PATENT DOCUMENTS 2,035,578  3/1936  Wagner ............................ 260/75 R 3,721,649  3/1973  Dominiguez-Burguette ..... 260/47 C

OTHER PUBLICATIONS

Morgan, P. W., Journ. of Poly. Sci: Part A, vol. 2, pp. 437–459 (1964).
Chemical Abstracts, vol. 67 (1967), 74052y and 100458g.
Ibid, vol. 69 (1968), 36504f.
Ibid, vol. 73 (1970), 56507v.

Primary Examiner—Lucille M. Phynes

[57] ABSTRACT

Self-extinguishing, non-dripping, melt processible copolyesters of reduced toxicity are provided from a mixture of diols comprising from about 25 to 60 mole percent of phenolphthalein and from about 75 to 40 mole percent of ethylene glycol and a dicarboxylic acid comprising isophthalic acid and/or terephthalic acid.

10 Claims, No Drawings

SELF-EXTINGUISHING, NON-DRIPPING, PHENOLPHTHALEIN POLYESTER MOLDING COMPOSITIONS

BACKGROUND OF THE INVENTION

The production of molding grade polyester resins such as polyethylene terephthalate which are self-extinguishing and have high resistance to heat is of considerable commercial importance. For instance, molded articles of polyester resins are required to be self-extinguishing for many uses and are also required to endure without deterioration the heat of the molding operation as well as the heat in the environment in which they are used.

It has been observed that certain polyesters, such as polyethylene terephthalate and polybutylene terephthalate, in addition to being combustible, melt and drip readily during combustion. While the flammability of these polymers can be substantially reduced by the incorporation therein of one or more flame retardants, they are known to pose a significant fire hazard when utilized in certain fire sensitive applications.

In addition, several disadvantages accompany the use of flame retardant additives as disclosed in the prior art. Most presently available envisioned flame retardant systems operate by the release of toxic volatile decomposition products such as halogens and phosphorus compounds. Thus, the production of smoke and toxic fumes may be a problem in environments characterized by enclosed areas, such as aircraft and home interiors.

Another disadvantage associated with the use of polyester molding compositions of the prior art which incorporate various flame retardant additives heretofore proposed is that they tend to possess properties which interfere with the appearance of molded articles formed from the same in certain end use applications. For instance, many flame retardant additives heretofore proposed tend to separate from the polymeric matrix and to exude from the same over extended periods of time. The additive may become visually apparent on the surface of the molded article as a fine powder, etc.

Other disadvantages resulting from the use of flame retardant additives in the polyester composition include discoloration of the resin when exposed to use and the increased expense attributable to the presence of large quantities of the additives.

It has also been generally observed that phenolphthalein has been utilized to prepare a wide variety of polymers including polyesters. See, for example, Morgan, P. W. "Linear Condensation of Polymers from Phenolphthalein and Related Compounds", Journal of Polymer Science, volume 2, pages 437 to 459 (1964); Vinogradova, S. V.; Salazkin, S. N.; Khoruzhendo, L. N.; Kukkov, A. A. and Korshanc, V. V. "Effect of Impurities in N,N-dimethylformamide on the Breaking of the Ester Bond", Zh. Vses. Khim. Obshchest,19(3), 357 (1974); Shitikov, V. K.; Kiseley, B. A.; Stepanova, N. V.; Trofimenko, V. V.; Korshank, V. V.; and Sergeev, V. A. "Copolymers Containing Phenolphthalein", Plaste Kautsch, 21 (10), 734–6 (1974); Japanese Pat. No. 74/88928, Aug. 26, 1974, and Wagner U.S. Pat. No. 2,035,578.

Polyesters prepared from phenolphthalein and isophthalic or terephthalic acid or mixtures thereof possess fire retardant properties but have such high softening temperatures that they cannot be fabricated by conventional melt processing techniques and are not suitable molding compounds.

It is therefore an object of the present invention to provide polyesters having a melt viscosity suitable for molding applications.

It is a further object of the present invention to provide polyesters which are non-dripping when subjected to a flame even in the absence of other additive substances.

It is a further object of the present invention to provide inherently flame retardant polyesters useful in molding applications which decompose when subjected to a flame to yield relatively innocuous gaseous products.

It is a further object of the present invention to provide polyesters which are self-extinguishing when subjected to a flame even in the absence of conventional flame retardant additives.

These and other objects as well as the scope, nature, and utilization of the claimed invention will be apparent from the following detailed description and appended claims.

SUMMARY OF THE INVENTION

In the presently claimed invention there is provided a flame retardant polyester of the recurring structural formula

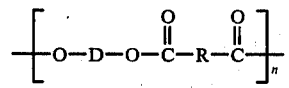

wherein D is a divalent radical remaining after removal of the hydroxyl groups from a diol mixture comprising from about 25 to 60 mole percent phenolphthalein and correspondingly from about 75 to about 40 mole percent ethylene glycol; and R is a divalent radical remaining after removal of carboxyl groups from a dicarboxylic acid selected from the group consisting of isophthalic acid and terephthalic acid and mixtures thereof and $n$ equals at least 10.

DESCRIPTION OF THE PREFERRED EMBODIMENTS

The copolyesters as prepared in accordance with this invention contain the structural units:

A. phenolphthalein

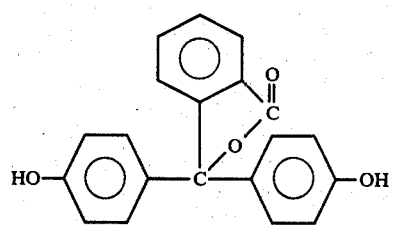

B. ethylene glycol

C. iso- and/or terephthalic acid

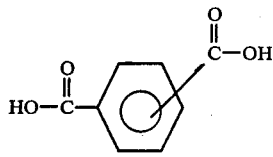

which units are joined in a random pattern to form long molecular chains, with an acid unit alternating with a diol unit and which may be illustrated by the recurring structural formula:

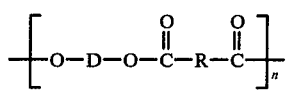

wherein D is a divalent radical remaining after removal of hydroxyl groups from a diol mixture comprising phenolphthalein, and ethylene glycol in certain specified amounts; and R is a divalent radical remaining after removal of carboxyl groups from a dicarboxylic acid selected from the group consisting of isophthalic acid and terephthalic acid and mixtures thereof, and n equals at least 10 (e.g., 10 to 200). Thus, the resulting copolyester comprises a diol portion derived from a mixture of about 25 to about 60 mole percent, preferably from about 40 to about 50 mole percent, (e.g., 45 mole percent) phenolphthalein and correspondingly from about 75 to about 40 mole percent, preferably from about 60 to about 50 mole percent (e.g., 55 mole percent) ethylene glycol and an acid portion derived from isophthalic acid or terephthalic acid, or as in the preferred embodiment of a mixture of isophthalic and terephthalic acids comprising from about 25 to about 75 mole percent, preferably from about 55 to about 65 mole percent (e.g., about 60 mole percent) isophthalic acid and correspondingly from about 75 to about 25 mole percent, preferably from about 55 to about 35 mole percent (e.g., 40 mole percent) terephthalic acid.

Although the acid portion may be derived from isophthalic or terephthalic acid alone it becomes advantageous to increase the amount of isophthalic acid as the mole percent of the phenolphthalein is increased in the polymer. By increasing the amount of isophthalic acid which has the effect of lowering the melting point of the resulting polymer it is possible within certain limits to compensate for an increase in the melting point of the polymer brought about by the increased utilization of phenolphthalein and thereby preserve optimum melt processibility of the polymer.

If the mole percent of phenolphthalein in the diol portion is below about 60%, the copolymer can be melt extruded. At higher ratios than about 60%, the phenolphthalein copolymer melts at temperatures in excess of 320° C, but because of cross-linking which takes place at these high temperatures the melt cannot be moved in accordance with standard molding and extruding operations. At levels of phenolphthalein below about 25 mole percent the copolymers begin to behave similar to polyethylene terephthalate and are flammable and drip when ignited.

Thus it has been found that the narrow range of percentages which designate the proportion of phenolphthalein which may be present in the resulting copolyester is critical to preserving a balance between flame retardant properties and melt processibility. By preserving this balance a versatile polyester is produced which does not require the use of extraneous flame retardant additives and thereby substantially eliminates the problems of toxic decomposition products associated with these additives.

It has also been found that upon combustion, the copolyester of the present invention yields $CO_2$ and water at temperatures as high as 500° C. Where the temperature of combustion exceeds about 500° C, small amounts of phenol and benzene are also given off. Thus, the danger of contacting the skin or lungs with highly toxic substances resulting from the decomposition of either the polymer substrate itself or from flame retardant additives associated therewith is substantially eliminated.

The copolyesters of the present invention may be prepared by a number of techniques such as solution polymerization by the reaction of acid chlorides of terephthalic and/or isophthalic acids with phenolphthalein and ethylene glycol in a solvent such as methylene chloride in the presence of an acid acceptor.

These copolyesters may also be prepared by the ester interchange method in which the mixture of glycols is heated with diphenyl esters of terephthalic and/or isophthalic acids, preferably in the presence of a suitable catalyst. The alcohol released is distilled out of the reactor mixture, thereby forming glycol phthalates, which are polymerized to the proper molecular weight by further heating under vacuum.

A preferred method of preparation is disclosed in Hamb, F. L. "Copolyesters of Glycols and Bisphenols - A New Preparation Process", *J. Poly. Sci.*, Polymer Chemistry Edition, Volume 10, pages 3217–3234, (1972), herein incorporated by reference.

In accordance with this process a preformed polyethylene terephthalate polyester is brought into the molten state in the presence of isophthalic acid, terephthalic acid, or mixtures thereof depending upon the desired composition of the resulting copolyester and an equimolar amount of the diacetate of phenolphthalein. Initially the polyester and the phenolphthalein diacetate melt are mutually soluble while the terephthalic acid is insoluble and remains suspended in the melt. As the reaction proceeds, the melt viscosity rapidly decreases, and the solids slowly dissolve. After the initially heterogeneous mixture becomes clear, vacuum is applied until the melt becomes so viscous that stirring is difficult.

The initial step of this process has been visualized as an esterolysis and acidolysis giving rise to acetates and acids of various chain lengths which couple together in a polymerization step to give a polymer of high molecular weight.

In order to obtain a molar ratio of from about 25:75 to about 60:40 of phenolphthalein:ethylene glycol in the final copolyester composition, from about 25 mole percent to about 60 mole percent of phenolphthalein diacetate is added to the polyethylene terephthalate melt, said mole percent being based on the total number of moles of the ethylene glycol and phenolphthalein present in the melt. To obtain a molar ratio of from about 40:60 to about 50:50 (e.g., 45:55) of phenolphthalein:ethylene glycol in the resulting copolyester the phenolphthalein diacetate is present in the melt in an amount which may vary from 40 mole percent to 50 mole percent (e.g., 45 mole percent). Where the acid component of the resulting copolyester comprises only terephthalic acid equimolar amounts of the phenolphthalein diacetate and terephthalic acid are added to the melt. However, to obtain copolyesters wherein the acid component comprises from about 25 to 75 mole percent by weight isophthalic acid and correspondingly about 75 to 25 mole percent by weight terephthalic acid from about 33 mole percent to about 300 mole percent of isophthalic acid by weight of the polyethylene terephthalate in the melt is added to the melt. Alternatively, to obtain a copolyester wherein the acid component comprises from about 55 to about 65 mole percent (e.g., 60 mole percent) isophthalic acid and correspondingly from about 45 to 35 mole percent (e.g., 40 mole percent) terephthalic acid, from about 122 mole percent to about 185 mole percent by weight of isophthalic acid is added to the polyethylene terephthalate melt.

The temperature of the melt may vary from 200° C to 325° C, preferably from about 250° C to about 300° C, most preferably from about 270° C to about 290° C. At higher temperatures diphenyl ether may be added towards the end of the polymerization reaction to thin down the melt.

Typical reaction times may vary from about 1 hour to about 8 hours with the polymerization reaction being conducted for a period sufficient to obtain a copolyester having an intrinsic viscosity (I.V.) which may vary from about 0.2 to about 1.5, preferably from about 0.4 to about 1.0, most preferably from about 0.5 to about 0.7. The intrinsic viscosity is determined by measuring the relative viscosity of a 0.1% solution of the polymer at 25° C in a suitable solvent, such as a 10/7 (w/w) mixture of phenol/trichlorophenol. The viscosity of the polymer solution is measured relative to the solvent along and the intrinsic viscosity (I.V.) is determined from the following equation.

$$I.V. = \frac{\ln \frac{V_2}{V_1}}{C}$$

In the above formula, $V_2$ is the efflux time of the solution, $V_1$ is the efflux time of the solvent, and C is the concentration expressed in grams of polymer per 100 milliliters of solution. As is known in the polymer art, intrinsic viscosity is monotonically related to the molecular weight of the polymer.

The non-dripping properties of the copolyester of the present invention may be confirmed via the standard UL-94 Flammability Test. For instance, a bar of 4 inches × 1½ inches × 1/16 inch may be formed by injection molding. The molded article is vertically mounted in a clamp, and a cotton pad is placed 12 inches below the bottom edge of the article. A ¾ inch blue flame from a natural gas Bunsen burner is applied to the lower edge of the article for 10 seconds. The burner is then removed, the flame-out time determined, and the flame immediately reapplied for 10 seconds. The flame is thereafter removed and flame-out time again determined. In order for the article to pass this test it must: (a) not have any article burn for more than 10 seconds after each application of the flame, (b) not have a total flaming time exceeding 30 seconds for a set of three articles, and have no melted drippings ignite the cotton pad.

For the purposes of the present description the given molded article prepared from the claimed copolymer is considered to be "non-dripping" when in accordance with the above test no burning droplets are observed when the flame is removed. For the purposes of the present description a given molded article is considered to be "self-extinguishing" when in accordance with the above test it does not burn longer than 10 seconds when the flame is removed.

The mechanism by which the copolyesters of the present invention achieve self-extinguishing properties upon exposure to a flame, is believed to be the formation of a char which acts as an insulating barrier preventing the radiation of heat back to the decomposing layers and also interfering with the diffusion of oxygen to the area of fuel formation. Self-extinguishing substances usually exhibit char values of 40% or more.

The copolyesters of the present invention may be readily molded to form three-dimensional shaped articles using conventional molding techniques. Either compression or injection molding procedures may be utilized.

The composition of the present invention when molded into a three-dimensional shaped article is suited for use in applications where a high degree of flame retardant properties is essential and is particularly suited where noxious off-gases as a result of pyrolytic decomposition is sought to be substantially reduced. For instance, the polyesters of the present invention are particularly suited for use in high temperature electrical applications, distributor caps, terminal blocks, miscellaneous automotive under-the-hood applications, airplane interior components, automotive vents, etc., boat interiors or exteriors, cushions for various vehicle seats such as airplane seats, automobile seats, bus seats, etc. The polymer compositions of the present invention may contain one or more plasticizers, antioxidants, stabilizers, antistatic agents, fillers, pigments and the like but the amounts of such additional material should not be such as to detract from the flame retardant drip resistant and relatively non-toxic character of the composition as a whole.

The following examples are given as specific illustrations of the claimed invention. It should be understood, however, that the invention is not limited to the specific details set forth in the examples.

EXAMPLE I

A mixture of 9.608 grams (0.05 mole) polyethylene terpehthalate, 8.306 grams (0.05 mole) terephthalic acid, and 20.12 grams (0.05 mole) phenolphthalein diacetate is weighed into a 200 milliliter, long neck flask. The mixture is placed in a bath at 280° C and during stirring it is covered with a nitrogen flush. After 3 hours the mixture is a clear melt. A vacuum of 10 milliliters is applied and the temperature increased to 300° C. After 2 hours the flask is opened to a nitrogen atmosphere and the thick melt allowed to cool. The product had an intrinsic viscosity of 0.60, and a 50:50 ratio of phenolphthalein:ethylene glycol.

EXAMPLE II

A mixture of 9.608 (0.05 mole) polyethylene terephthalate, 24.9 grams (0.15 mole) isophthalic acid and 60.36 grams (0.15 mole) phenolphthalein diacetate is weighed into a 200 milliliter, long necked flask. The mixture is placed in a bath at 280° C and during stirring it was covered with a nitrogen flush. After 3 hours the mixture is a clear melt. A vacuum of 10 millimeters is applied and the temperature increased to 320° C. After 2 hours, the flask is opened to a nitrogen atmosphere and the thick melt allowed to cool. The product had an intrinsic viscosity of 0.55 and a 75:25 ratio of phenolphthalein:ethylene glycol and an isophthalic:terephthalic ratio of 75:25.

The polyesters prepared in accordance with Examples I and II are passed through a single screw extruder and the extrudate is pelletized and the pellets are injection molded at 330° C into test bars measuring 4 × 1½ × 1/16 inches in a 3 ounce Newbury machine. The test bars are subjected to a flammability test and to physical property measurements.

The flammability tests are carried out following Underwriter's Laboratory Subject 94 Procedures. A minimum of 3 bars are tested for burning time after two ignitions. After each (10 seconds) ignition, the test bars must extinguish within 30 seconds and the bars must not drip during the burning to be classed as non-burning or self-extinguishing. The physical property tests are carried out by standard procedures: tensile strength, ASTM 638; flexural strength and modulus ASTMD 790; impact strength ASTMD 256; heat distortion temperature, ASTMD-648 the results are as follows:

|  | Example I | Example II |
| --- | --- | --- |
| UL 94 flammability (sec. 1st/sec. 2nd) | 0/1, 0/0, 0/1 (no dripping) | 0/0, 0/0, 0/0 (no dripping) |
| Tensile strength, psi | 7,500 | 6,780 |
| Flexural strength, psi (5% deformation) | 10,260 | 8,500 |
| Flexural modulus, psi | $3 \times 10^5$ | $3 \times 10^5$ |
| Izod impac. strength, ft lbs/in notch | 2.5 | 3.0 |
| Heat distortion temperature, °C | 132° C | 156° C |

It can be seen that the copolyester according to this invention meets the Underwriter's Laboratories Subject 94 flame retardant requirements.

To determine the nature and toxicity of the gases resulting from combustion of the polymers prepared in Examples I and II a mass/spectral analysis was performed. Thus, the polymers Examples I and II are subjected to conditions at which combustions would take place and the volatile products of combustion are analyzed.

The polyesters of phenolphthalein are found to yield mostly carbon dioxide and water, with small amounts of phenol up to 525° C. Benzene appears in small amounts at temperatures in excess of 525° C.

In contrast to this polyethylene terephthalate was found to yield acetaldehyde, with some terephthalic acid and benzoic acid.

Although the invention has been described with preferred embodiments, it is to be understood that variations and modifications may be resorted to as will be apparent to those skilled in the art. Such variations and modifications are to be considered within the purview and the scope of the claims appended hereto.

We claim:

1. A flame retardant polyester of the recurring structural formula

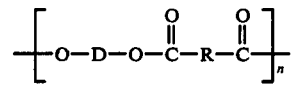

wherein D is a divalent radical remaining after removal of hydroxyl groups from a diol mixture comprising from about 25 to about 60 mole percent of phenolphthalein and correspondingly about 75 to about 40 mole percent of ethylene glycol; and R is a divalent radical remaining after the removal of carboxyl groups from a dicarboxylic acid selected from the group consisting of isophthalic acid, terephthalic acid, and mixtures thereof, and n equals at least 10.

2. The flame retardant polyester of the recurring structural formula of claim 1 wherein R is a divalent radical remaining after removal of carboxyl groups from a mixture of dicarboxylic acids which comprises from about 25 to 75 mole percent by weight isophthalic acid or ester forming derivatives thereof, and correspondingly about 75 to 25 mole percent by weight terephthalic acid or the ester forming derivatives thereof.

3. The flame retardant polyester of the recurring structural formula of claim 1 wherein the mixture of diols comprises from about 40 to about 50 mole percent phenolphthalein and correspondingly from about 60 to about 50 mole percent ethylene glycol.

4. The flame retardant polyester of the recurring structural formula of claim 1 wherein the mixture of diols comprises from about 40 to about 50 mole percent phenolphthalein and correspondingly from about 60 to about 50 mole percent ethylene glycol, and the mixture of dicarboxylic acids comprises about 60 mole percent by weight isophthalic acid or ester forming derivatives thereof and correspondingly about 40 mole percent by weight terephthalic acid or the ester forming derivative thereof.

5. The flame retardant polyester of the recurring structural formula of claim 1 wherein the mixture of diols comprises about 45 mole percent phenolphthalein and about 55 mole percent ethylene glycol.

6. The flame retardant polyester of the recurring structural formula of claim 1 wherein the mixture of diols comprises about 45 mole percent phenolphthalein and about 55 mole percent ethylene glycol, and the mixture of dicarboxylic acids comprises about 60 mole percent isophthalic acid or the ester forming derivatives thereof and about 40 mole percent terephthalic acid or ester forming derivatives thereof.

7. The flame retardant polyester of the recurring structural formula of claim 1 wherein the intrinsic viscosity of said polyester may vary from about 0.2 to about 1.5.

8. The flame retardant polyester of the recurring structural formula of claim 1 wherein n equals from about 10 to about 200.

9. The flame retardant polyester of the recurring structural formula of claim 1 wherein the intrinsic viscosity of said polyester may vary from about 0.4 to about 1.0.

10. The flame retardant polyester of the recurring structural formula of claim 1 wherein the intrinsic viscosity of said polyester may vary from about 0.5 to about 0.7.

* * * * *